United States Patent

Nguyen et al.

Patent Number: 6,115,496
Date of Patent: Sep. 5, 2000

[54] METHOD AND APPARATUS FOR ACCELERATING IMAGE DATA COMPRESSION

[75] Inventors: Hungviet H. Nguyen, Fremont; Riaz A. Moledina, Woodside; Kok S. Chen, Sunnyvale, all of Calif.

[73] Assignee: Apple Computer, Inc., Cupertino, Calif.

[21] Appl. No.: 09/009,500

[22] Filed: Jan. 20, 1998

Related U.S. Application Data

[63] Continuation of application No. 08/462,626, Jun. 5, 1995, abandoned, and a continuation-in-part of application No. 08/397,372, Mar. 2, 1995, abandoned.

[51] Int. Cl.$^7$ ...................................................... G06K 9/36
[52] U.S. Cl. ........................................... 382/166; 382/239
[58] Field of Search ................................... 382/166, 167, 382/176, 232, 239; 358/539; 348/397

[56] References Cited

U.S. PATENT DOCUMENTS

| | | | |
|---|---|---|---|
| 4,965,754 | 10/1990 | Stansfield et al. | 382/239 |
| 5,046,119 | 9/1991 | Hoffert et al. | 382/239 |
| 5,247,589 | 9/1993 | Faul et al. | 382/166 |
| 5,719,969 | 2/1998 | Taguchi | 382/176 |

*Primary Examiner*—Christopher S. Kelley
*Attorney, Agent, or Firm*—Burns, Doane, Swecker & Mathis, L.L.P.

[57] ABSTRACT

The present invention is directed to systems and methods for compressing image data while at the same time, the speed of compression, the compression ratio (that is, reduced memory requirements) and the perceptibility of the decompressed image, even when the image data is compressed without segregation into its scanned and non-scanned components. Exemplary embodiments achieve such improved perceptibility regardless of whether the images are monochrome (having varying grey scale values) or color. In addition, improved perceptibility is realized in a manner which permits image data including scanned and/or unscanned images to be compressed in real-time.

9 Claims, 8 Drawing Sheets

| S | Y | M | C | K |

| S | Y | M | C |

| S | K |

| S | C0 | C1 | 16 bit MASK |
|---|----|----|-------------|

Fig. 5a

| S | C0 | C1 | Mask Lookup Index |
|---|----|----|-------------------|

Fig. 5b

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|

Fig. 5c

| 15 | 14 | 13 | 12 |
|----|----|----|----|
| 11 | 10 | 9  | 8  |
| 7  | 6  | 5  | 4  |
| 3  | 2  | 1  | 0  |

Fig. 5d

| 1 | 0 | 0 | 1 |
|---|---|---|---|
| 0 | 1 | 0 | 0 |
| 1 | 0 | 1 | 0 |
| 0 | 0 | 0 | 1 |

→

| C1 | C0 | C0 | C1 |
|----|----|----|----|
| C0 | C1 | C0 | C0 |
| C1 | C0 | C1 | C0 |
| C0 | C0 | C0 | C1 |

Fig. 5e

| C | C | C | C | ... | C |
|---|---|---|---|-----|---|

| M | M | M | M | ... | M |
|---|---|---|---|-----|---|

| Y | Y | Y | Y | ... | Y |
|---|---|---|---|-----|---|

| K | K | K | K | ... | K |
|---|---|---|---|-----|---|

Fig. 7

METHOD AND APPARATUS FOR ACCELERATING IMAGE DATA COMPRESSION

RELATED APPLICATIONS

The present application is a continuation, of application Ser. No. 08/462,626, filed Jun. 5, 1995 now abandoned, which is a Continuation-In-Part of commonly assigned U.S. application Ser. No. 08/397,372, filed Mar. 2, 1995 now abandoned entitled "METHOD AND APPARATUS FOR COMPRESSION OF DIGITIZED IMAGE DATA USING VARIABLE COLOR FIDELITY", herein incorporated by reference.

BACKGROUND OF THE INVENTION

1. Field of the Invention

The present invention relates generally to compression and decompression of digitized image data used, for example, to represent text, graphics and scanned images. More particularly, the invention relates to encoding variant color image data during compression of the image data.

2. State of the Art

Digitized images displayed on scanners, monitors and printers are typically quantized on a pixel-by-pixel basis and stored in memory as pixel maps, more commonly referred to as pixmaps. A pixmap is a two-dimensional array of picture elements mapped to locations of the digitized image.

To provide sufficient color range and fidelity, each pixel is typically stored in memory as a set of color coordinates which define the pixel's color location in a given color space. For example, a pixel is typically represented by its red, green and blue color component values, or by its cyan, magenta and yellow color component values. The fidelity of the color reproduction is a function of the accuracy with which each color component is represented.

Due to the increased volume of data required to represent color images, effort has been directed to compression of color data pixmaps. Because it is not practical or possible to provide a digital representation for all possible colors, the data used to represent each color component is necessarily compromised. Color fidelity is further compromised when the data used to represent the various colors of an image is compressed.

Early attempts at image compression relied upon techniques deemed suitable for non-scanned image data (such as text and synthetic graphics), assuming that they would work equally well for scanned images. One such technique was run-length coding, as described in "Inside Macintosh, Volumes I, II, III", Addison-Wesley, Reading, Mass., 1985, ISBN 0-201-17737-4. Run-length compression exploits the repetition of pixel values in long data "runs" by transmitting a single pixel value together with the length of the "run". Such techniques are relatively simple and effective for data used to represent text and line-art. However, run-length coding techniques have proven less suitable for scanned images (such as scanned photographs or video images) where numerous colors typically exist.

More advanced compression techniques are directed to maintaining color as close to full fidelity as possible. However, these techniques are theoretically "lossy" in that information content (such as edge acuity of text included in the image) is not maintained.

For example, "Data Compression—Techniques and Applications", Van Nostrand, Reinhold, N.Y. 1985, ISBN 0-534-03418, describes the use of transform-based compression techniques for image data. These techniques, such as the Hadamard Transform, the Fourier Transform and the Principal Component Transform (also known as the Karhunen-Loeve Transform), transform one- or two- dimensional data into a space having more desirable properties. One such property is an ability to easily distinguish which data points can be encoded with less precision, or even dropped, without noticeably degrading the image perceived by the unaided eye when an inverse transform is applied to the lossy representation.

The Hadamard Transform transforms an input space into one which is spanned by the Walsh-Rademacher functions. The Fourier Transform transforms the input space into one which is spanned by complex exponentials. The Principal Component Transform transforms the input space into one which is spanned by the eigenvectors associated with the input data. Although the Principal Component Transform is preferred, the amount of computation required to perform compression is practically prohibitive.

More recently, the Discrete Cosine Transform was developed to avoid the prohibitive computation of the Principal Component Transform. The basis functions of the Discrete Cosine Transform are cosines of various frequencies. For photographic images, this transform has been determined to yield results closer to that of the Principal Component Transform than any transform other than the Principal Component Transform itself. The Discrete Cosine Transform, in combination with entropy-preserving compression techniques, evolved into the industry standard (Joint Photographic Experts Group) JPEG compression, as described in "Graphics File Formats", Windcrest/McGraw-Hill, Blue Ridge Summit, Pa., 1992, ISBN 0-8306-3059-7.

With the exception of the Hadamard Transform and a few others, the basis functions of the transforms used for image compression tend to be smooth functions. This is the case with the complex exponentials of the Fourier Transform and the cosine functions of the Discrete Cosine Transform. Therefore, these transforms do not yield good compression ratios when sharp edges are to be represented without perceptible degradation. Although these transforms are suited to representing scanned images, they are far from ideal for representing text and synthetic graphics.

Known efforts for compressing image data have addressed this drawback of compression transforms by segregating the data of a pixmap into two components: (1) scanned image components and (2) all remaining components (such as text and synthetic graphics). Once segregated, the scanned image components are passed through compression techniques better suited for compressing scanned images (such as the JPEG industry standard compression techniques). The remaining components of the image data are separately passed to compression techniques better suited for objects that require good edge acuity (such as run length encoding).

However, this technique of segregating image data components suffers significant drawbacks. One such drawback is that the function of segregating presents problems. Objects included within the image data have to be tagged as scanned image data or as non-scanned image data before being placed into the pixmap. Otherwise, there is no way of determining the type of object to which a pixel belongs. Additional complexities result when overlapping areas of scanned images and non-scanned images are included within the image data.

Accordingly, it would be desirable to provide a technique for compressing image data without requiring the complexities associated with segregating the image data into its scanned and non-scanned components. It would further be desirable to reduce any perceptible degradation of the decompressed image, regardless of whether the image data includes scanned images, non-scanned images or any combination thereof. Further, it would be desirable to achieve such features using reduced amounts of memory storage, and using techniques suitable for real-time compression of an incoming data stream.

SUMMARY OF THE INVENTION

The present invention is directed to systems and methods for compressing image data while at the same time, the speed of compression, the compression ratio (that is, reduced memory requirements) and the perceptibility of the decompressed image, even when the image data is compressed without segregation into its scanned and non-scanned components. Exemplary embodiments achieve such improved perceptibility regardless of whether the images are monochrome (having varying grey scale values) or color. In addition, improved perceptibility is realized in a manner which permits image data including scanned and/or unscanned images to be compressed in real-time.

Generally speaking, exemplary embodiments relate to a method and apparatus for processing a frame of image data by partitioning the frame of image data into a plurality of partitioned blocks of pixels; identifying each partitioned block as being color variant, color invariant, or clear (such as is the case with a totally white page); storing color values of at least some of said pixels; and storing information which identifies each partitioned block as being color variant, color invariant or clear. Subsequently, the frame of image data can be compressed by retrieving the information which identifies each partitioned block as being color variant, color invariant or clear, and controlling a retrieval of said color values in response to said retrieved information.

In accordance with exemplary embodiments of the present invention, enhanced processing speed can be realized with reduced memory requirements. More particularly, when the retrieved information identifies a given partitioned block as being clear, the partitioned block can be immediately compressed without examining any color values associated with that block. Further, when the retrieved information identifies a given partitioned block as being color invariant, then only a single pixel of the partitioned block need be examined to determine a color value associated with all pixels of the color invariant block. Only when the retrieved information identifies a given partitioned block as being color variant are color values for all pixels of that block retrieved. As a result, compression speed can be significantly increased since the color values for each pixel in clear blocks need not be retrieved.

Further, compression speed can be further enhanced by retrieving the information associated with a plurality of the partitioned blocks in groups. For an entire group of blocks (for example, four partitioned blocks in a four block group), wherein all partitioned blocks are determined to be clear, no color values for the pixels in any of the partitioned blocks of the group need be retrieved, thereby significantly enhancing processing speed. Similarly, where all partitioned blocks in the group are color invariant, then only a single pixel value for each partitioned block within the group need be retrieved to compress the four block group. Only when any partitioned block of the group includes color variant data are color values associated with more than a single pixel specifically retrieved.

BRIEF DESCRIPTION OF THE DRAWINGS

Other objects and advantages of the present invention will become more apparent from the following detailed description of preferred embodiments when read in conjunction with the accompanying drawings wherein like elements are designated by like numerals and wherein:

FIGS. 5a–5e illustrate exemplary formats for encoding color variant image data;

FIG. 7 illustrates an exemplary format for storing color data in memory;

DETAILED DESCRIPTION OF THE PREFERRED EMBODIMENTS

1. System Overview

Figure 1:
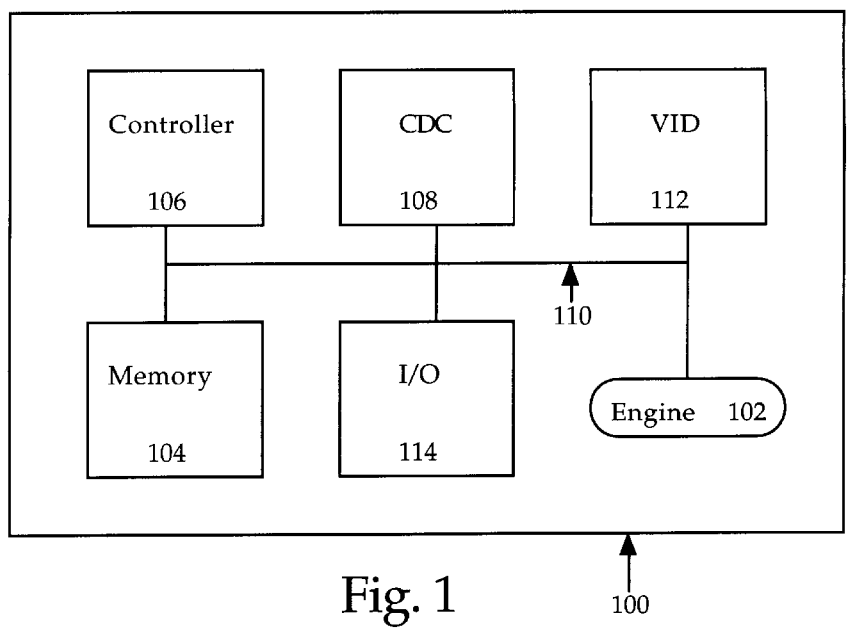
FIG. 1 illustrates a printing control system which incorporates an exemplary embodiment of the present invention.

FIG. 1 illustrates an exemplary embodiment of an apparatus for processing a frame of image data such that the image data can be encoded for compression in accordance with an exemplary embodiment of the present invention. As referenced herein, image data corresponds to data obtained from an image that can be quantized (for example, digitized) for storage in a pixmap and subsequently compressed. Image data that is compressed in accordance with exemplary embodiments of the present invention can be digitized image data captured through any instrumentation, such as a video camera.

Image data as referenced herein encompasses scanned data as well as non-scanned data. Non-scanned data typically includes character glyphs and graphical data, such as hand-sketched or computer generated graphics. Those skilled in the art will appreciate that image data processed in accordance with exemplary embodiments of the present invention can also include any combination of scanned and non-scanned data.

As referenced herein, a frame of quantized image data corresponds to a preselected group of digitized data, such as the data associated with a display screen or a printed sheet. Typically, such image data is obtained from or reproduced using a scanner device, a monitor or a printing device. However, those skilled in the art will appreciate that the image data can merely be processed for transfer between two locations (for example, between two computers).

It will be appreciated that exemplary embodiments of the present invention can be applied to the processing of image data for reproduction using any visual medium. In the case of printing, the image will typically be reproduced on conventional size paper such as letter size, A4, B5 and legal size. However, those skilled in the art will appreciate that the present invention can be applied to images of any size which are reproduced in any format.

To facilitate an understanding of the present invention, FIG. 1 illustrates a printing system 100 which incorporates features of the present invention. The FIG. 1 printing system includes a color laser engine 102, such as any commercially available color laser marking engine. For purposes of the following discussion, the term "color" includes use of multiple colors (such as red, green and blue), as well as grey-scale printing using varying shades of gray.

Referring to FIG. 1, an incoming frame of data is directed by a processor, represented as printing system controller 106 having associated memory 104, to a compression/decompression coprocessor 108 (CDC). In the exemplary embodiment of FIG. 1, the printing system controller 106 partitions a frame of quantized image data into partitioned blocks. The compressor/decompression coprocessor 108 constitutes an exemplary apparatus for processing a frame of image data by compressing the image data within each of the partitioned blocks. More particularly, the coprocessor 108 includes a processor for prequantizing image data by selectively eliminating bits used to represent at least one color component of each pixel for the frame of image data and for encoding the remaining bits of the prequantized data to compress the prequantized data.

Because the amount of memory typically required to store an entire frame of image data within the printing system 100 is impractical, an entire frame of uncompressed data is not stored within the printing system 100 at any given time. Rather, a frame buffer stores the incoming frame of image data in portions (for example, on a row-by-row basis), for sequential processing. As each portion of the frame is compressed, another portion is fetched by the printing system controller. As a result, an entire frame of image data is only stored in the print system 100 after it has been compressed in a manner to be described in accordance with exemplary embodiments of the present invention.

In accordance with exemplary embodiments, the printing system controller 106 can be a reduced instruction set computer (RISC) such as the 33 Megahertz 29030 processor available from Advanced Micro Devices. The printing system controller 106 pre-processes an incoming frame of image data to: (a) scale the image data to a desired resolution; (b) partition the image data into partitioned blocks of a predetermined size; (c) resample the image data to ensure its alignment with the partitions; (d) filter the image data to ensure that each partitioned block contains no more than a predetermined number of color variations; and (e) create a side information buffer with information acquired during the pre-processing that can be used to enhance performance during subsequent processing.

In accordance with exemplary embodiments, the compressing of image data includes an initial step of classifying each partitioned block based on whether the partitioned block is determined to be color variant or determined to be color invariant. This step of classifying can be implemented by comparing the pixels within a given partitioned block to one another during the pre-processing to determine whether a given partitioned block is color variant or color invariant. Once having classified each partitioned block as being either color variant or color invariant, the compression/decompression co-processor 108 can be used to further compress the data. Those skilled in the art will appreciate that the steps of classifying each partitioned block as being either color variant or color invariant can be performed by the printing system controller 106 as part of the pre-processing (for example, classification information can be stored in the side information buffer), or can be performed by the compression/decompression coprocessor 108.

In accordance with exemplary embodiments, the compression/decompression coprocessor compresses the image data included in the partitioned blocks of pixels to substantially reduce the memory requirements required to store a frame of image data. The compression/decompression coprocessor compresses the image data within each partitioned block by representing a block which is determined to include color variations with less color fidelity than a block which is determined not to include color variations. Further, the compression/decompression coprocessor uses memory (that is, any specified memory) for storing the compressed image data as a representation of the original image. Alternately, the compressed image data can be immediately transmitted from the printing system 100 as it is compressed, for external buffering and decompression.

In an exemplary embodiment, a decompression engine is included within the compression/decompression coprocessor for use during the compression process. Recall that an entire frame of uncompressed image data is not stored in the printing system 100 at any given time; rather the entire frame is stored and compressed in sequentially processed portions. The decompression engine is provided within the compression/decompression coprocessor to accommodate a situation where newly received image data is to be superimposed on portions of the frame which have been earlier compressed. In this situation, the earlier compressed portion of the frame is retrieved, decompressed and returned to the frame buffer. The decompressed data which has been returned to the frame buffer is then overlaid with the newly received image data, after which the superimposed image data is recompressed.

The compression/decompression coprocessor 108 can, for example, be formed as a monolithic application specific integrated circuit (that is, an ASIC chip). However, those skilled in the art will appreciate that the processing implemented by the coprocessor 108 can be performed by the same processor used to implement the functions of the controller 106. Alternately, the compression/decompression functions can be implemented with any or all other functions of the FIG. 1 system in a single ASIC using a single processor. Further, those skilled in the art will appreciate that the compression and decompression functions of the FIG. 1 system can be implemented in software or hardware. In the exemplary FIG. 1 embodiment, the compression functions are implemented using software and hardware, while the decompression functions are primarily implemented in hardware.

Once a frame of image data has been compressed and stored in the compression/decompression coprocessor, it can subsequently be transferred to the printer engine 102 via a system bus 110 and a video interface device (VID) 112. The video interface device can, for example, be formed as a separate ASIC chip having a decompression processor to support decompression and half-toning. Alternately, a single processor can be used to implement the functions of the controller 106, the coprocessor 108 and video interface device 112. The video interface device provides high quality reproduction of the original image from its compressed format.

The FIG. 1 system further includes an input/output (I/O) communications device 114. The input/output communications device can include, for example, built-in networking support as well as parallel/serial I/O ports. Further, the I/O communications device can include additional memory as well as memory expansion ports. Any conventional I/O communications features can be used in accordance with the present invention, such that the I/O communications device need not be described in detail.

Before describing the compression/decompression operation in detail, the data format of uncompressed image data will be described. Afterward, pre-processing of the uncompressed image data will be discussed. Further, exemplary data formats of compressed image data will be discussed.

2. Uncompressed Image Data Format

A frame of image data associated with an original image has a is given width and length. The number of pixels in a given row of a scan line across the width of the frame is set in a horizontal total pixel count register. In accordance with exemplary embodiments of the present invention, the value set in the horizontal total pixel count register is divisible by 4.

In a vertical direction, along the length of the frame (and in the case of printing, along the paper motion direction), the number of pixels is set in a vertical total pixel count register. Again, the value set in the vertical total pixel count register of exemplary embodiments is divisible by 4.

In accordance with exemplary embodiments, the user can also set the number of bits used to represent each color component for a given pixel to 1, 4 or 8 bits. For example, if the user selects 4 color components to define a pixel, with each color component being represented by 8 bits, then each pixel would be represented as a 32-bit word (that is, 8 bits for each of the cyan, magenta, yellow and black color components).

In accordance with exemplary embodiments, the color of a pixel can be represented by any number of color components, including 1, 3 or 4 color components. For example, a four color component representation includes cyan, magenta, yellow and black color components. For a given application, when the number of color components used to represent a given color is set to 1, the color of a pixel is defined by the magnitude of a single color component (such as black). When the number of color components is set to three, the color components used can be cyan, magenta and yellow color components. When the number of color components is set to be four, the 4 color components mentioned above can be used to define the color of a given pixel.

Where each of four color components in each pixel of a pixmap is encoded with 8-bits, a letter-size page having approximately 32 million, 600 dots per inch (dpi) color pixels, requires approximately 128 Megabytes of memory to store the page. Because a memory requirement of 128 Megabytes per page is cost prohibitive, exemplary embodiments of the present invention are directed to compressing this data in a manner which ensures the integrity of color fidelity in the decompressed image.

3. Pre-processing of Image Data

As mentioned previously, uncompressed image data which is received for storage in the frame buffer is preprocessed to optimize the compression process. The preprocessing includes: (a) scaling a frame of digitized image data to ensure that each partitioned block will have the same number of pixels; (b) partitioning the frame into blocks having a predetermined number of pixels; (c) resampling the image data to account for misalignment between the frame of image data and partitioned blocks; (d) filtering to reduce the number of color variations within each partitioned block to a predetermined number; and (e) creating a side information buffer to enhance subsequent performance during compression.

a. Scaling

Scaling is implemented by the printing system controller 106 of FIG. 1 to ensure that an input image has a resolution which will match the selected size of partitioned blocks. For example, where a partitioned block is selected to include a 4-by-4 array of pixels, the incoming frame of image data is scaled to ensure that the number of pixels in each row and in each column is a multiple of 4.

The scaling can be implemented in any known fashion. For example, scaling can be implemented using pixel replication as described by Dale A. Schumacher in chapter 4 ("Fast Anamorphic Image Scaling") of the book entitled *Graphic Gems II*; Arvo, James; San Diego: Academic Press, Inc. 1991, the disclosure of which is hereby incorporated by reference. It may be that a frame of image data has been generated at a resolution of 72 dots per inch. Using pixel replication, the image data can be scaled up to 150 dots per inch for subsequent transfer to the compression/decompression coprocessor.

Those skilled in the art will appreciate that any scaling techniques can be used in accordance with exemplary embodiments of the present invention. Such scaling techniques can be used to either scale up or scale down an input frame of image data to any user selected resolution.

b. Partitioning

In accordance with the exemplary embodiment described herein, each frame of image data is partitioned into blocks formed as 4-by-4 pixel arrays. The exact block size can be set by the user as a block size field stored in a register.

Those skilled in the art will appreciate that the partitioned blocks can have any number of pixels, and that the blocks can be of any desired shape. It is only preferable that the blocks are capable of being tiled in non-overlapping fashion to encompass the entire image. For example, the shape of each partitioned area need not be square, but can be rectangular, cross-shaped, or shaped as described in "Tilings and Patterns, an Introduction", by W. H. Freeman, New York, 1989, ISBN 0-7167-1998-3, the disclosure of which is hereby incorporated by reference.

Those skilled in the art will appreciate that such partitioning is not limited to a single shape, but can be a combination of shapes. Further, those skilled in the art will appreciate that non-tiled and/or non-overlapped blocks can be used at some possible expense to the compressed buffer size and/or the integrity of the compressed data relative to the original image.

c. Resampling

In accordance with exemplary embodiments, a frame of image data is repositioned when the center of a 4-by-4 pixel block does not align with the center of a partitioned block. For example, it is possible that an incoming frame of image data is already at the desired resolution, such that scaling of the data is not necessary. However, the image data may not be aligned with the preselected partitions of the memory where the uncompressed data is stored (for example, the frame buffer).

For example, the image data may be such that the first partitioned block of pixels in the frame buffer is only half full of data (that is, either the first two rows or the first two columns of a 4-by-4 partitioned block contain no image data). In this case, the image data included within the pixel block is resampled such that the center of the resampled data is repositioned in alignment with the center of a partitioned block. This repositioning can be achieved by any conventional resampling technique. For example, resampling can be achieved using spatial filtering, nearest neighbor filtering, bi-linear interpolation, bi-cubic interpolation and so forth.

d. Color Variation Limiting

In accordance with exemplary embodiments, the compressing of image data includes the step of classifying each partitioned block as color variant or color invariant. In connection with this step of classifying, the image data is processed to ensure that no partitioned block includes greater than a predetermined number of color variations. Such processing can be achieved in any number of ways.

In an exemplary embodiment, each partitioned block is limited to at most two different colors. The two colors which are retained can be those deemed furthest from one another in a given color space. However, those skilled in the art will appreciate that each partitioned block can be limited to any number of colors (for example, 7 or more colors).

For example, where each partitioned block is limited to two colors and where a given block includes the colors red, blue and light blue, the light blue pixels can be converted to blue. Where more than two colors within a partitioned block are separated from one another in a given color space by more than a predetermined amount (e.g., a partitioned block includes the colors green, red and blue), color averaging of the pixels can be used to determine a single averaged color for all pixels within the partitioned block. Where color averaging is used, a previously multi-color partitioned block can be subsequently treated as a color invariant block (that is, a single color block) during the compression process.

In addition to the techniques mentioned above, an arbitrary selection of the colors which are to be retained can be used. For example, the first two colors detected in each partitioned block can be selected as the two colors to which all pixels in that block will be mapped.

In yet another embodiment, the color of the first pixel examined can be selected as the first color, and the color of each subsequent pixel can be compared against that of the first pixel. The color deemed furthest from the first color in a given color space can be selected as the second color, and each pixel in block can be mapped to one of these two colors.

The foregoing techniques for limiting the color variations of a partitioned block to a predetermined number are by way of illustration only. Those skilled in the art will appreciate that any number of such techniques can be devised.

e. Side Information Buffer

In an exemplary embodiment, the pre-processing can also include the creation of a side information buffer. The side information buffer can be used to store any characteristics of the pre-processed data which can be used to enhance the efficiency of subsequent compression or decompression processing.

For example, as the image data is pre-processed to limit the number of colors in each partitioned block to a predetermined number, the printing system controller 106 can store information which identifies each partitioned block as color variant, color invariant or clear (that is, totally white). Such information can be encoded for each partitioned block as a 2-bit value in the side information buffer.

More particularly, during the pre-processing of a frame of image data, each pixel of each partitioned block is examined to classify each partitioned block as color variant, color invariant and if desired, clear. The detection and classification of the partitioned blocks as being color variant, color invariant or clear can be performed while the color values are being stored in a frame buffer prior to image data compression. A color value for each pixel can be stored in the memory 104 of FIG. 1 at a location used to store at least a subset of the frame of image data during pre-processing. Upon the completion of processing each partitioned block in the subset of image data currently being processed, the exemplary 2-bit index can be stored in a location of the side information buffer, which can also be included in the memory 104, to identify whether the partitioned block was color variant, color invariant or clear. Those skilled in the art will appreciate that where a partitioned block is determined to be clear, internal processing of the processor 106 can be configured to refrain from storing any color values in the memory 104. During subsequent compression, the side information buffer can be used to identify that the partitioned block, and all pixels included therein, were clear, such that no color values need be fetched from the memory 104 for that partitioned block.

For color invariant blocks, only a single color is associated with all pixel values in the partitioned block. Accordingly, those skilled in the art will appreciate that a single color value for the entire partitioned block could be stored in the memory 104 at this time, rather than storing a color value for each pixel. However, in accordance with exemplary embodiments of the present invention, a color value is stored for each pixel value in the memory 104, and a subsequent compression of that color value information is performed by the compression/decompression coprocessor 108.

In accordance with exemplary embodiments, the plurality of partitioned blocks of pixels included in a frame of image data can be grouped into subsets of N partitioned blocks. For example, N can be set to 4, such that 4 partitioned blocks of pixels are grouped together for compression.

Figure 2A:
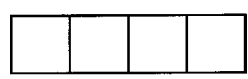
FIGS. 2a–2g represent exemplary blocks of image data which can be processed in accordance with exemplary embodiments of the present invention.

During compression, the compression/decompression coprocessor accesses the side information buffer of memory 104 as each partitioned block in a group of partitioned blocks is accessed. Referring to FIG. 2A, the first group of 4 partitioned blocks stored in the memory 104 is examined first. However, rather than examining actual color values associated with the pixels in this group, exemplary embodiments provide a side information buffer which is separately addressable by the compression/decompression coprocessor (that is, separate from portions of the memory which include color value information). Thus, the compressor/decompressor can independently examine the information in the side information buffer associated with these 4 blocks.

In accordance with exemplary embodiments, the information in the side information buffer is examined sequentially for each partitioned block in a group currently under consideration. As each block within the group is examined, the compression/decompression coprocessor 108 determines whether the block is clear, color invariant or color variant. In the case of FIG. 2a, the side information buffer would identify each of the four partitioned blocks included in the first group as being clear. As a result, the compression/decompression coprocessor would use the information from the side information buffer to encode these four partitioned blocks as clear, and would not access any of the color value information which may or may not have been stored in connection with these partitioned blocks within memory 104.

Thus, processing speed of partitioned blocks encoded in the side information table as being clear is significantly enhanced since the color values for each of the 16 pixels included in partitioned blocks of this first group need not be retrieved. In other words, by retrieving the information stored in the side information buffer for the first group of partitioned blocks, the compression/decompression coprocessor controls a retrieval of color values from the memory 104 prior to compression of the image data.

Figure 2E:
Figure 2B:

FIG. 2b illustrates a group of four partitioned blocks which are color invariant. Again, the compression/ decompression coprocessor 108 first retrieves information stored in the side information buffer associated with each of the four partitioned blocks of FIG. 2*b*. Because the 2-bit value in the side information buffer for each of the four partitioned blocks will identify each of the four partitioned blocks as being color invariant, the compression/decompression coprocessor can control a retrieval of only a single color value associated with, for example, the uppermost left hand pixel in the first partitioned block. This color value can then be used to encode a color value for all pixels included of the four block groups. All four of the partitioned blocks in FIG. 2*b* can then be encoded using a color invariant compressed data format to be described later.

Figure 2F:
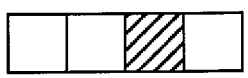
Figure 2C:

FIG. 2*c* illustrates a group of four partitioned blocks wherein three of the four blocks are clear, and the second of the four blocks is color invariant. Again, information which identifies each of the partitioned blocks as being either color variant, color invariant or clear is retrieved from the side information buffer. This information identifies the second of the four blocks as being color invariant. As a result, the compression/decompression coprocessor 108 retrieves a color value for at least one pixel in each of the four partitioned blocks. A color value associated with the at least one pixel for each partitioned block can then be used by the compression/decompression coprocessor 108 to compress the color for each of these partitioned blocks using the compressed data format for color invariant blocks.

Of course, those skilled in the art will appreciate that while the foregoing discussion refers to the retrieval of a color value for a single pixel, any number of pixels can be examined if desired. For example, in some circumstances, it may be easier to develop software for retrieving an entire row of pixels in each partitioned block when the group of blocks is detected to include two or more different classifications of color image data (such as a block of color invariant image data and a block of clear image data).

FIGS. 2*d*–2*g* illustrate groups of partitioned blocks wherein at least one partitioned block includes color variant data. If during retrieval of information from the side information buffer for each of the partitioned blocks, any one of the partitioned blocks is sequentially determined to be color variant, then the compression/decompression coprocessor retrieves the color value for each pixel included in the partitioned block. The image data for that partitioned block is then compressed using a compressed data format for color variant blocks to be described.

Figure 2G:
Figure 2D:

FIGS. 2*d*–2*g* illustrate different exemplary possibilities which can occur during retrieval of groups of four partitioned blocks. In FIG. 2*d,* all four blocks are determined to be color variant such that the color values for each pixel in all four blocks must be retrieved from the memory 104 prior to compression.

FIG. 2*e* illustrates a group of four partitioned blocks wherein the third block is determined to be color variant. In response to detecting that the third partitioned block is color variant, the compression/decompression coprocessor retrieves color values for all pixels in the groups of partitioned blocks since the exemplary embodiment is configured to process all blocks of a group in similar fashion.

FIG. 2*f* illustrates a situation where three of the four partitioned blocks in the group are clear. However, because the third partitioned block is color variant, pixel values for all four partitioned blocks would be retrieved from the memory 104.

In FIG. 2*g,* color invariant blocks are detected until the fourth block in the group is examined. Because the fourth block is color variant, the compression/decompression coprocessor 108 would retrieve color values for all pixels in the group of partitioned blocks as described previously.

Those skilled in the art will appreciate that while groups of four partitioned blocks are retrieved from the memory 104, any number of partitioned blocks can be included in a group. Those skilled in the art will appreciate that in some situations, minor inefficiencies may occur due to the processing of partitioned blocks in groups. One example of this is the examples in FIGS. 2*e*–2*g* wherein color values for all pixels in the group of partitioned blocks are retrieved according to the exemplary embodiment described above, even though not all of the partitioned blocks are color variant. However, because significant processing advantages are achieved where the groups of partitioned blocks are either all clear, all color invariant, or a combination of color invariant and clear, the inefficiencies associated with processing groups of partitioned blocks as illustrated in FIGS. 2*e*–2*g* is an acceptable trade-off. Of course, those skilled in the art will appreciate that partitioned blocks can be grouped in any user-specified manner to accommodate a particular type of input image which is to be processed. For example, where the user knows in advance that frames of image data to be processed represent pages which are, for the most part, all white (i.e., clear), processing speed can be enhanced by grouping larger number of partitioned blocks to be processed by the compression/decompression coprocessor.

Figure 3A:
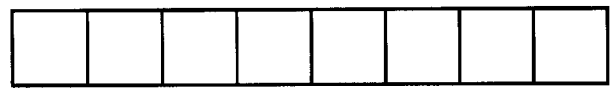
FIGS. 3a–3g represent exemplary embodiments of image data which can be compressed in accordance with exemplary embodiments wherein each partitioned block includes 8 consecutive blocks.

For example, FIGS. 3*a*–3*g* illustrate groups of eight partitioned blocks. FIG. 3*a* illustrates a situation where all of the eight partitioned blocks are determined to be clear based on information in the side information table. Thus, the compression/decompression coprocessor can compress a group of eight partitioned blocks without retrieving any information from the memory 104 other than information included in the side information buffer.

Figure 3B:
Figure 3C:
Figure 3D:
Figure 3E:
Figure 3F:
Figure 3G:

FIG. 3*b* illustrates a situation where all eight blocks included in the group are color invariant. FIG. 3*c* illustrates a situation where all of the blocks are either clear or color invariant. Again, because no color variant block is included in the group of eight partitioned blocks, the compression/decompression coprocessor 108 can compress the image data included in this group of eight partitioned blocks by merely examining the color values for a reduced number of pixels (for example, the first row of pixels) in each partitioned block.

In FIGS. 3*d*–3*g,* at least one block in the group of eight partitioned blocks includes variant color data. Thus, as was described with respect to FIG. 2, the compression/decompression coprocessor retrieves color values for all pixels in each of the partitioned blocks when compressing these groups of partitioned blocks.

Thus, exemplary embodiments can significantly enhance the processing speed of a frame of image data. Exemplary embodiments exploits statistical facts, such as: (1) the burst read of four consecutive partitioned blocks incurs a relatively slight penalty relative to random fetches; and (2) for a given image or textual page, there is a relatively high probability that the same data or data of similar type will repeat itself over an area. Exemplary embodiments exploit these statistical facts using a side information buffer as described previously, such that the compression/decompression coprocessor 108 need not scan and/or retrieve the entire frame buffer of raw image data.

The added processing required to scan the side information buffer in accordance with exemplary embodiments of the present invention does not incur significant performance penalty. Rather the compression/decompression coprocessor can be configured to always look ahead to the next group of consecutive partitioned blocks to be processed while compression of the current group is being performed. In accordance with exemplary embodiments, the compression/decompression coprocessor can thus be maintained busy for a sufficiently long enough period of time to impose minimum performance constraints on the overall compression process.

Those skilled in the art will appreciate that while an exemplary embodiment has been described with respect to identifying and distinguishing color invariant blocks, color variant blocks and clear blocks, any specified blocks can be specifically identified during the preprocessing and used to enhance the speed of the compression process. For example, those skilled in the art will appreciate that blocks determined to have certain color characteristics, such as saturated colors, can be identified during the pre-processing and afforded a unique encoding in the side information buffer. As a result, processing of the specified blocks can be enhanced during compression.

Further, those skilled in the art will appreciate that while the side information buffer has been described as a separately addressable portion of the memory 104 (FIG. 1), the side information buffer can, of course, be formed as a separate memory altogether. Alternately, the side information buffer can be formed in any one of the components illustrated in FIG. 1, the only limitation being that the side information table must be accessible to receive the classification information of each partitioned block as the color values for each partitioned block as the color values for each partitioned block are examined during pre-processing, and must also be accessible during the compression process.

4. Compressed Data Format

In accordance with exemplary embodiments of the present invention, a compressed data format (CD) is used whereby a single data word represents an entire partitioned block of pixels. For example, a single data word of up to 32 bits can be used to reconstruct what was previously described by the sixteen 32-bit words of a 4-by-4 pixel array, without creating noticeable color degradation of the decompressed image regardless of whether the image includes scanned images, non-scanned images or any combination of the two.

The location of compressed data in memory of the compression/decompression coprocessor is defined by a compression data pointer resister. Because exemplary embodiments described herein are directed to the use of memory space having 32-bit word locations, words of up to 32 bits can be specified as a user-defined compressed data width field. In accordance with exemplary embodiments, a "compressed data word" is used to represent a compressed data block, and all such compressed data blocks are stored back-to-back in memory, regardless of the specified compressed data width, to maximize the use of memory.

In accordance with exemplary embodiments, two different word formats are used for compressed data: (1) a compressed data format for partitioned blocks determined to be color variant; and (2) a compressed data format for partitioned blocks determined to be color invariant. Color variant blocks are encoded with high edge acuity and reduced color fidelity, while color invariant blocks are encoded with high color fidelity. In exemplary embodiments, the most significant bit in both the color variant data block and the color invariant data block, referred to as the select (S) bit, identifies the compressed block as being either color variant or color invariant (that is, non-variant).

a. Color Invariant Compressed Data Block

Figures 4A, 4B, 4C, 4D:
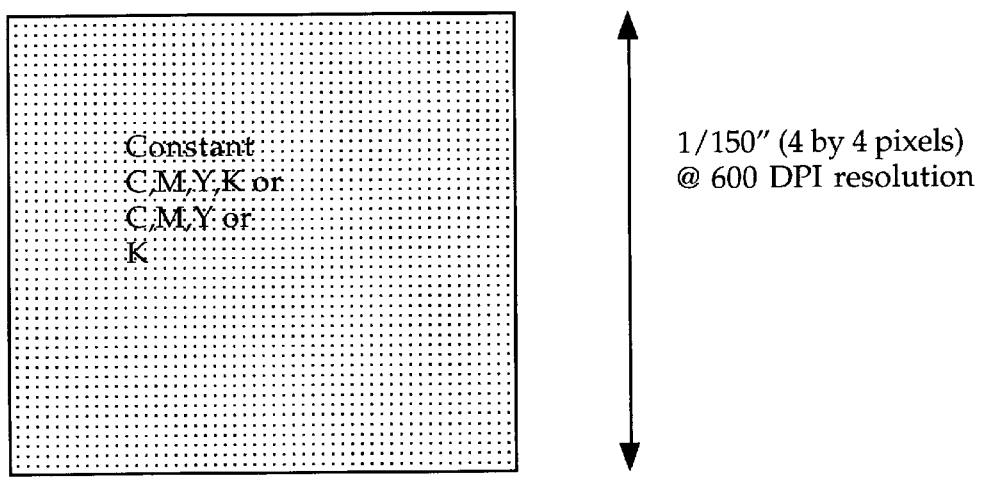
FIGS. 4a–4d illustrate an exemplary format for encoding color invariant image data.

A non-variance compressed data block, as illustrated in FIG. 4a, is used to encode the pixels in a partitioned block where all pixels have the same color (see FIG. 4d). The user can specify the number of bits used to describe each color component of the single color associated with the color invariant block of pixels. Thus, the number of bits used to define each color component, in conjunction with the number of color components selected by the user to represent each pixel, will define the bits of a non-variance compressed data block.

In an exemplary embodiment, the number of bits used to describe the color of a color invariant block must be at least one bit less than the total number of bits available to describe each compressed data block of pixels (that is, 31 in the above example) to account for the select bit. In the exemplary embodiment described herein, the user can select any of three different sets of color components; that is, (1) cyan, magenta, yellow and black; (2) cyan, magenta and yellow; or (3) a single color component. Accordingly, three different types of non-variance compressed data blocks can be used, as illustrated in FIGS. 4a, 4b and 4c. In each case, a different number of bits can be used to represent the color components without exceeding the 31 bit limit of the exemplary embodiment.

For example, where black is the only color component used, any number of bits (for example, 8-bits) can be used to represent the black component of FIG. 4c. Of course, the FIG. 4c format can also be used where only the yellow, magenta or cyan color component has been selected to represent non-variant blocks. However, where all of the cyan, magenta, yellow and black color components are used, any number of bits (for example, 7-bits) can be used to represent each of these components via the FIG. 4a format; where 7-bits are used for each color component, the total word length, including the select bit, would be 29-bits.

b. Color Variant Compressed Data Block

A color variant compressed data block, used to represent partitioned blocks that include pixels of various colors, is illustrated in FIG. 5a. An alternate embodiment of a color variant compressed data block is illustrated in FIG. 5b. These data formats include: (1) a predetermined number of indexed color locations; and (2) a mask for mapping each pixel of the partitioned, color variant block to one of the indexed colors. Recall that in accordance with exemplary embodiments, each partitioned block is pre-processed to include at most two different colors; the two colors for a given data block are, in an exemplary embodiment, represented in the compressed data blocks of FIGS. 5a and 5b as 6-bit color indices for a first color (C0) and a second color (C1).

The 6-bit values for C0 and C1, included within the variance compressed data block serve as indices for searching a variance color look-up table. In an exemplary embodiment, the variance color look-up table stores a plurality of 32-bit color values in 64 locations, with a specific location being addressed by the values of C0 and C1. For example, the first entry in the variance color look-up table can correspond to white and the last entry can correspond to black. All data entries in between correspond to various colors ranging from white to black, (that is, colors having varying amounts of the cyan, magenta, yellow and black color components).

As illustrated in FIG. 5a, the color variant compressed data block includes: a single bit location for the select bit; a 6-bit location for the color C0; a 6-bit location for the color C1; and a 16-bit mask wherein each bit corresponds to one pixel of the 4-by-4 block.

FIG. 5b illustrates the use of a compressed mask which serves as an index to a compression mask look-up table where a complete mask is stored. A compressed mask will be referenced herein as a mask index.

For partitioned blocks of 4-by-4 pixels having an uncompressed mask of 16 bits, compressed mask sizes of 8, 9 and 10 bits can be used in accordance with exemplary embodiments. However, those skilled in the art will appreciate that such mask sizes are by way of illustration only, and that any number of bits can be included in both the uncompressed mask and the compressed mask.

To accommodate use of either the FIG. 5a mask format or the FIG. 5b mask format, the compression mask look-up table, which is pointed to by a mask base register, is included in memory. During compression, the 16 bit mask obtained from a 4-by-4 partitioned block can be used to index the compression mask look-up table which, in an exemplary embodiment, is a 64 k entry table. In an exemplary implementation, each location in the mask look-up table stores two compressed masks, such that the table is actually configured in memory as a 32 k-entry-by-32 bit table (note that multiple non-compressed masks can be mapped to the same compressed mask, if desired). During decompression, the mask base register points to a 1 k decompression mask look-up table, which in an exemplary implementation, is actually configured as a 512 entry memory wherein each entry includes two decompressed masks.

FIG. 5c illustrates an exemplary embodiment of a 16 bit mask. The numbers shown in each of the FIG. 5c bit locations illustrate the manner by which the 16-bit mask maps to pixel locations of the 4-by-4 partitioned block illustrated in FIG. 5d. With the data format of FIG. 5a, the 16 bit mask is stored, in its entirety, within the compressed data block. However, with the data format of FIG. 5b, the 16 bit mask is stored in the compression mask look-up table pointed to by the mask base register and addressed by the mask index included in the compressed data block.

FIG. 5e illustrates an example wherein the binary values of a 16 bit mask in a color variant compressed data block map either the color C0 or the color C1 to each of the pixel locations of the 4-by-4 partitioned block. In accordance with an exemplary embodiment, a value of 0 at any given location of the 16-bit mask can be considered to correspond to the color C0, while a 1 at any of the 16-bit locations in the 16-bit mask can be considered to correspond to the color C1. Thus, a 16-bit mask having the binary values illustrated in the left hand side of FIG. 5e will map the colors C0 and C1 to the pixel locations shown in the right hand side of FIG. 5e.

The C0 and C1 values can, in an exemplary embodiment, also be stored as compressed values within the compressed data block of FIGS. 5a and 5b. In this case, an additional encoding table can be provided to expand the compressed C0 and C1 values to an address for the variance color look-up table.

c. Encoding Of Variant Color Data For Variance Color Look-Up Table

In the exemplary embodiment described, color invariant compressed data blocks can use the 29-bit data block to represent a single color and thereby preserve high color fidelity. However, the exemplary color variant compressed data blocks use an exemplary 6-bit color index (that is, C0 or C1) to select a 32-bit color value from a 64 entry variance color look-up table. Because only 6-bits are used to represent a color, all colors extant throughout the world must be represented by the 64 colors included in the variance color look-up table. As described previously, color fidelity of color variant blocks is therefore sacrificed to preserve high edge acuity and reduce memory requirements. Recall that high edge acuity is obtained by encoding each of 16 pixels in a block with one of at least two different colors is used to define edges in the image.

By using both color invariant data blocks and color variant data blocks, high edge acuity can be preserved in partitioned blocks which include edge information, while high color fidelity can be preserved in partitioned blocks which are color invariant (that is, blocks which do not include edge information). While color fidelity of color variant data blocks could easily be improved by increasing the number of bits used for each color index C0 and C1 (thereby increasing the number of 32-bit color entries included in the variance color look-up table), an increased width of the color variant data block would sacrifice processing speed to such an extent that real-time processing of an incoming data stream could become prohibited. Accordingly, a goal of exemplary embodiments described herein is to optimize color fidelity of decompressed images generated from color variant data blocks while keeping the overall width of color variant data blocks (for example 29-bits) comparable to that of color invariant data blocks.

In accordance with exemplary embodiments of the present invention, a method and apparatus are provided for encoding the seemingly infinite array of different colors using only the 64 entries of the variance color look-up table. The 64 entries are chosen in a manner which optimizes color fidelity of an image that is reproduced from the color variant compressed data blocks.

Figure 8:
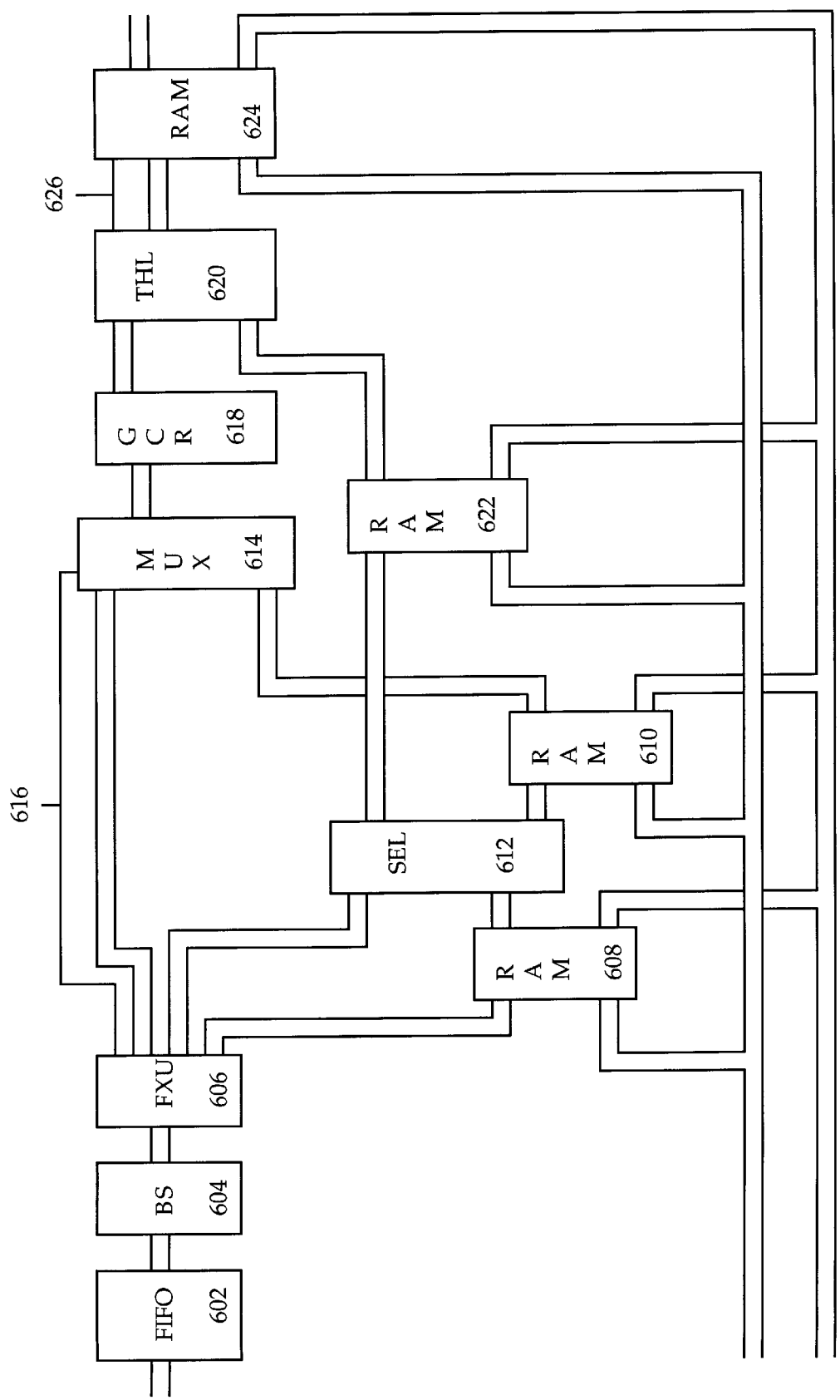
FIG. 8 illustrates an exemplary embodiment of hardware for decompressing data.

FIG. 4a illustrates uncompressed image data representing at least one color component of a monochrome or color image for an exemplary pixel of a pixmap. In the FIG. 4a illustration, each of four color components used to represent the pixel can be encoded with 8-bits. As shown in FIG. 4a, 8 bits are used to represent each of cyan (C), magenta (M), yellow (Y) and black (K) color components, such that a total of thirty-two bits are used to represent a single pixel of color data.

Recall that the color variant compressed data blocks of FIGS. 5a and 5b represent each pixel in a partitioned block of pixels (for example, 16 pixels) with one of two 6-bit color indices. All colors known to exist are therefore reduced to one of sixty-four 32-bit color entries stored in the variance color look-up table so that a decompressed 32-bit representation of color can be obtained for each pixel using the 6-bit index. In other words, the original 32-bits used to represent the color of each pixel in an input stream of image data are reduced to a 6-bit representation.

Note that while FIG. 4a illustrates a 32-bit color as having four 8-bit components, those skilled in the art will appreciate that any number of color components, represented with any number of bits can be used. For example, the 32-bits can be used to represent single color components (for example, grey scale images, or images formed of different shades of the same color). Those skilled in the art will also recognize that the 32-bits can be separated among the designated color components, in any desired manner. For example, a greater (fewer) number of bits can be used to represent a fewer (greater) number of color components. Further, while CMYK values are shown, those skilled in the art will appreciate that any known color space can be used (for example, RGB values).

In accordance with exemplary embodiments of the present invention, the encoded color indices are obtained from an exemplary 512 entry C0/C1 encoding table that is addressed by a 9-bit value. The 9-bit value used to address the C0/C1 encoding table is, in an exemplary embodiment, obtained from the 32-bit color value of the pixel by first dropping the four least significant bits of the cyan, magenta and yellow color components, leaving 20 bits. A predetermined combination of 9-bits is then selected from among these 20-bits. The 9-bits selected can be varied (that is, programmed) as desired based on any user specified criteria.

FIGS. 5a represents a means for compressing the quantized image data within each partitioned block, and can, in an exemplary embodiment, be included as a hardware device in the compression/decompression coprocessor 108 of FIG. 1. In FIG. 5a, the 32-bits of the image data for the single pixel shown in FIG. 4a are illustrated as input values Y0–Y7, M0–M7, C0–C7 and K0–K7, corresponding to each of the yellow, magenta, cyan and black color components, respectively. These 32 bits are supplied as the input to a means, such as a selector 502, for prequantizing at least one color component of the image data by selectively eliminating predetermined bits used to represent at least one color component of a single pixel. The selector 502 can be a 20-bit-to-9-bit barrel shifter which receives inputs from 20 predetermined bit locations of the 32-bit image data. These 20 predetermined bit locations can be fixed in advance by the user, and reconfigured as desired.

In the exemplary FIG. 5a embodiment, the 20 selected bit locations include the four most significant bits used to represent each of the yellow, magenta and cyan color components. By also retaining the 8-bits of the black color component in the exemplary embodiment illustrated, all 256 shades of grey can be retained and used to control the black toner of a monochrome printer. The resultant bit locations received by the barrel shifter 502 are illustrated in FIG. 4b, wherein portions of the color pixel lost after this initial compression are shaded.

The barrel shifter further prequantizes the image data by reducing the 20 selected bits to a 9-bit value. The 9-bits which are selected can, for example, be the three most significant bits for black, and the two most significant bits for each of the cyan, magenta and yellow color components. However, any combination of the bits can be used, such as the first, fourth and last bit of the black color component, and the first and fourth remaining bits of the cyan, magenta and yellow color components, or any other combination of bits. In an exemplary embodiment, the hardware barrel shifter thus functions as an interconnected matrix that can be altered by the user as desired (for example, on a page-by-page basis), or in response to any user selected criteria. Those skilled in the art will appreciate that software or any combination of hardware and software can be used to implement the selection process.

In the first prequantization level of compression, the 32-bit image data is thus selectively prequantized to encode the 32-bit input for each pixel as a 9-bit value. This prequantization achieves a seventy-two percent reduction in going from a 32-bit color pixel to a 9-bit color pixel.

In a second level of compression, the remaining 9-bits of prequantized image data are encoded to further compress the image data. In an exemplary embodiment, the 9-bit output of the barrel shifter is used to address the C0/C1 encoding table 504 of FIG. 5a which, in an exemplary embodiment, includes 512 entries. Each 9-bit address to the C0/C1 encoding table produces a 6-bit output which can be used as a color index.

A color index can be generated for each pixel. For example, where a partitioned block includes 16 pixels, 16 color indices can be generated from which C0 and C1 can be selected. Alternately, C0 and C1 can be selected using any technique described herein. For example, the first two colors detected in a partitioned block can be selected for use in generating C0 and C1 via the two-level compression described herein, with either C0 or C1 being used to represent the color of all pixels included in the partitioned block.

Thus, regardless of how C0 and C1 are selected from among the color indices associated with a given partitioned block in a frame of image data, all such color indices are generated using only two passes of color encoding. That is, the prequantizing pass followed by the encoding pass results in encoding the color of each 32-bit pixel as a 6-bit index (an eighty-one percent reduction).

The encoding of a 6-bit color index from a 9-bit value, in an exemplary embodiment, involves mapping each of the 9-bit values to one of the 64 colors in the variance color look-up table, represented as variance color look-up table 506 of FIG. 5a. This mapping can be achieved in any known fashion.

For example, empirical data can be acquired to identify the most visually pleasing color representation to be stored in the variance color look-up table based on colors expected to be present in the input image data. The colors stored in the variance color look-up table can thus be selected wholly independent of the original 32-bit colors values included in pixels of the incoming image data. More particularly, a color stored in the variance color look-up table can be a color located in the CMYK color space midway between two colors which are expected to be received by the selector 502.

Alternately, if only a limited number of colors are known in advance to be included in the original image data, then these colors can be stored in the variance color look-up table. For example, if the image data to be processed is known in advance to be limited to red, green and brown, then 31 shades for each of red, green and brown can be stored in the variance color look-up table and all of the 9-bit values can be mapped to one of these colors. Alternately, only dominant colors known in advance to be included in the image data can be stored in the variance color look-up table, and all 9-bit values mapped to one of the stored values.

Once the 32-bit values have been selected for storage in the variance color look-up table, empirical data can be used to determine the most visually pleasing match between each 9-bit input value and a color stored in the variance color look-up table. Based on this empirical data, a mapping of each 9-bit value to a 6-bit index which represents one of the entries in the variance color look-up table can be stored in the C0/C1 encoding table.

FIG. 5b illustrates an alternate embodiment wherein the first and second steps of prequantization described with respect to FIG. 5a are implemented by directly selecting a set number of bits (for example, 9-bits to be consistent with the FIG. 5a example). The set number of bits is then encoded to compress the prequantized data into a color index (for example, a 6-bit color index) used to address the variance color look-up table.

Further, the flexibility associated with exemplary embodiments described herein can be exploited such that the dominant colors included within any frame of image data are dynamically identified on a page-by-page basis. Based on this identification, the selector, the C0/C1 encoding table and/or the variance color look-up table can be modified. Alternately, a different C0/C1 encoding table and/or variance color look-up table can be selected for compression based on the dominant colors identified. In other words, the colors that best represent a given frame can be used in conjunction with the compression of image data associated with that frame. For example, FIG. 5c illustrates an exemplary embodiment where the prequantization of FIG. 5b results in a user-configured selection of 1-bit of cyan and all 8-bits of black.

Those skilled in the art will appreciate that the use of a two level color encoding in accordance with exemplary embodiments provides a relatively high level of color fidelity for partitioned blocks of image data which include edge information. Further, a two level color encoding which includes a single encoding table (that is, the exemplary 512 entry C0/C1 encoding table), provides high speed compression suitable for real-time processing.

Exemplary embodiments of the present invention therefore provide the user a high degree of flexibility by allowing for the arbitrary selection of many combinations of C,M,Y and K image data. The selector can be used to quickly reduce the input-image data in a manner which does not inhibit adaptability to any user-specific criteria. Further, the selector generates an output (the exemplary 9-bit value) that can address an encoding table, the output of the encoding table being an index which represents a color that may have no relationship to the original 32-bit color data. Those skilled in the art will appreciate that where the image data is compressed in accordance with exemplary embodiments of the present invention, a complementary decompression technique can be provided. The decompression can be performed in a manner similar to that described in the aforementioned commonly assigned U.S. application Ser. No. 08/397,372, filed Mar. 2, 1995 (Attorney Docket No. P1481/149), entitled "METHOD AND APPARATUS FOR COMPRESSION OF DIGITIZED IMAGE DATA USING VARIABLE COLOR FIDELITY", the disclosure of which is hereby incorporated by reference in its entirety.

Those skilled in the art will further appreciate that exemplary embodiments of the present invention for compressing color variant data can, if desired, be used in connection with compression of any image data in any format. For example, exemplary embodiments of the invention as described with respect to color variant data blocks can equally be used for color invariant data blocks to reduce the data required to represent a single color invariant data block. Further, exemplary embodiments of compressing color variant image data in accordance with exemplary embodiments, can be used for any environment including printing, video display and so forth.

4. Compression/Decompression Coprocessor (CDC)

a. CDC Configuration - Compression

Figure 6:
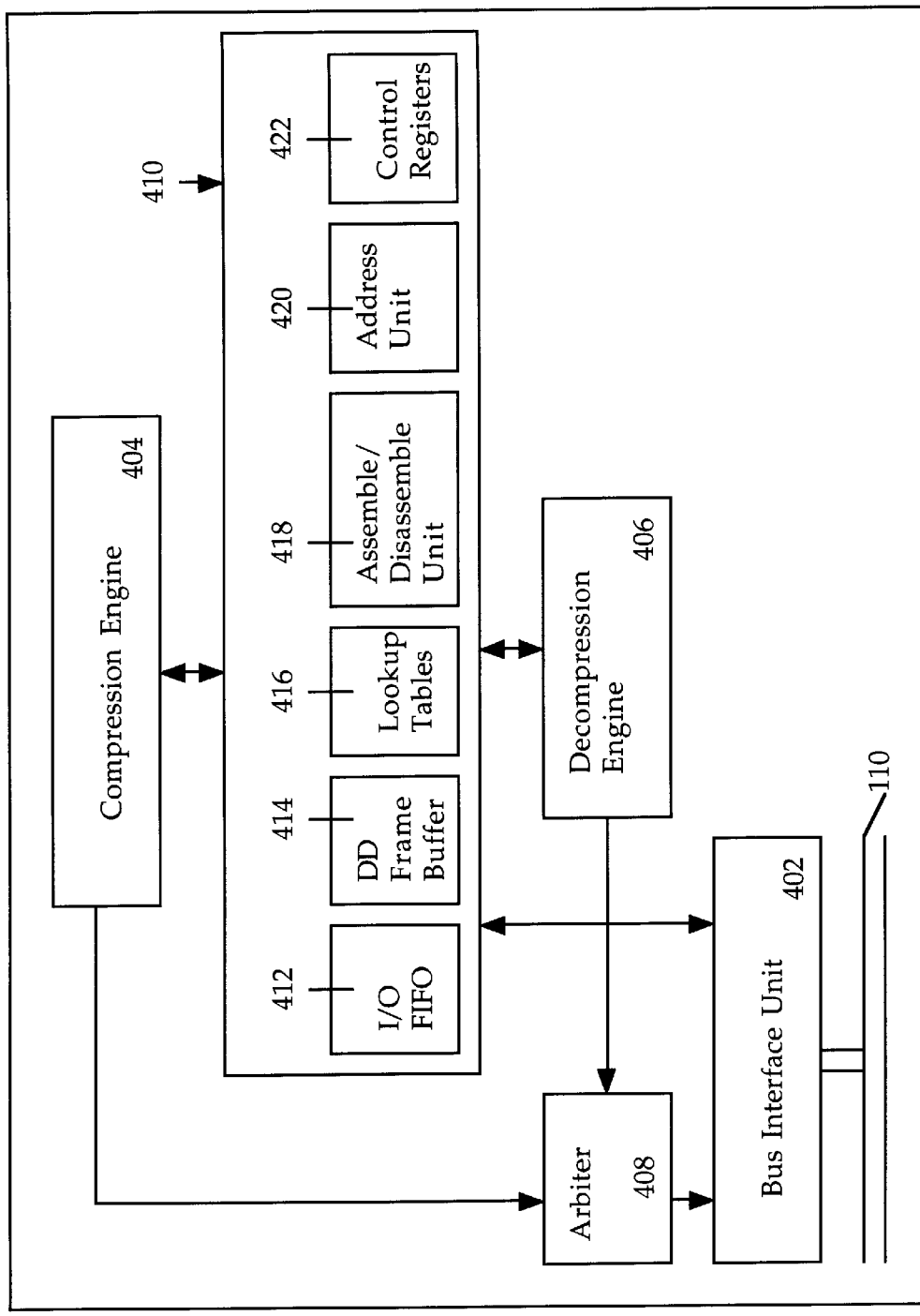
FIG. 6 illustrates an exemplary embodiment of a compression/decompression coprocessor for use in accordance with the present invention.

FIG. 6 illustrates a more detailed diagram of the exemplary compression/decompression coprocessor 108. The compression/decompression coprocessor 108 is interfaced to the system bus 110 via a bus interface unit 402. The compression/decompression coprocessor 108 includes a compression engine 404 and a decompression engine 406.

In an exemplary embodiment, the decompression engine 406 is used during the compression process. Recall that an entire frame of image data is not stored and processed at a single time, but rather is processed sequentially through the decompressed data frame buffer. The decompression engine of the compression/decompression coprocessor accommodates a situation where newly received image data is to be superimposed on portions of the frame which have been earlier compressed. In this situation, the earlier data is decompressed, and placed back into a frame buffer where it is overlaid with the incoming decompressed data. The later portion of the frame is therefore superimposed on the earlier processed data.

Access to the bus interface unit 402 by the compression engine 404 and the decompression 406 is controlled by an arbiter 408 which functions in any conventional manner. A scratch pad and data path block 410 is also provided and includes, among other features, resources such as registers and look-up tables used during operation of the compression/decompression coprocessor.

The scratch pad and data path block 410 includes an input/output first-in, first-out (I/O FIFO) buffer 412 for buffering information of the compression/decompression coprocessor. A decompression data frame buffer 414 (DD frame buffer) is also included, and is a double-buffered memory (as are most of the internal buffers). As one buffer of the DD frame buffer becomes full, the compression/decompression coprocessor can access data from that buffer while the bus interface unit 402 begins to fetch and load incoming image data to the other buffer.

The look-up tables 416 of the scratch pad and data path block 410 include the 64-entry variance color look-up table and the C0/C1 encoding look-up table. The variance color look-up table stores the limited range of colors used to describe partitioned blocks which are determined to be color variant (recall that a compression technique of the present invention encodes color variant blocks with reduced color fidelity). The C0/C1 encoding look-up table includes encoded values for C0 and C1. The compression and decompression mask look-up tables are also stored in memory 104 (FIG. 1). As will be apparent to those skilled in the art, all of these tables can be included in a single memory, or can be stored in separate memories.

A barrel shifter assembly/disassembly unit 418 is also included in the scratch pad and data path block. In an exemplary embodiment the number of bits in a compressed data word can be less than the number of bit locations allocated to each word in memory. Recall that in an exemplary embodiment, 29 bits are used to represent a partitioned block in compressed form, while exemplary words in memory are 32 bits. However, the compressed data words are loaded one next to the other in memory (that is, all 32 bits of each word location in memory are used to store compressed image data). Therefore, to provide accurate read-out of compressed data, barrel shifting is used to shift a compressed data word in memory before each field of that word is extracted.

An address generator unit 420 is also included in the scratch pad and data path block. The address generator accesses locations of the various registers and look-up tables included within the compression/decompression coprocessor.

Figure 7:
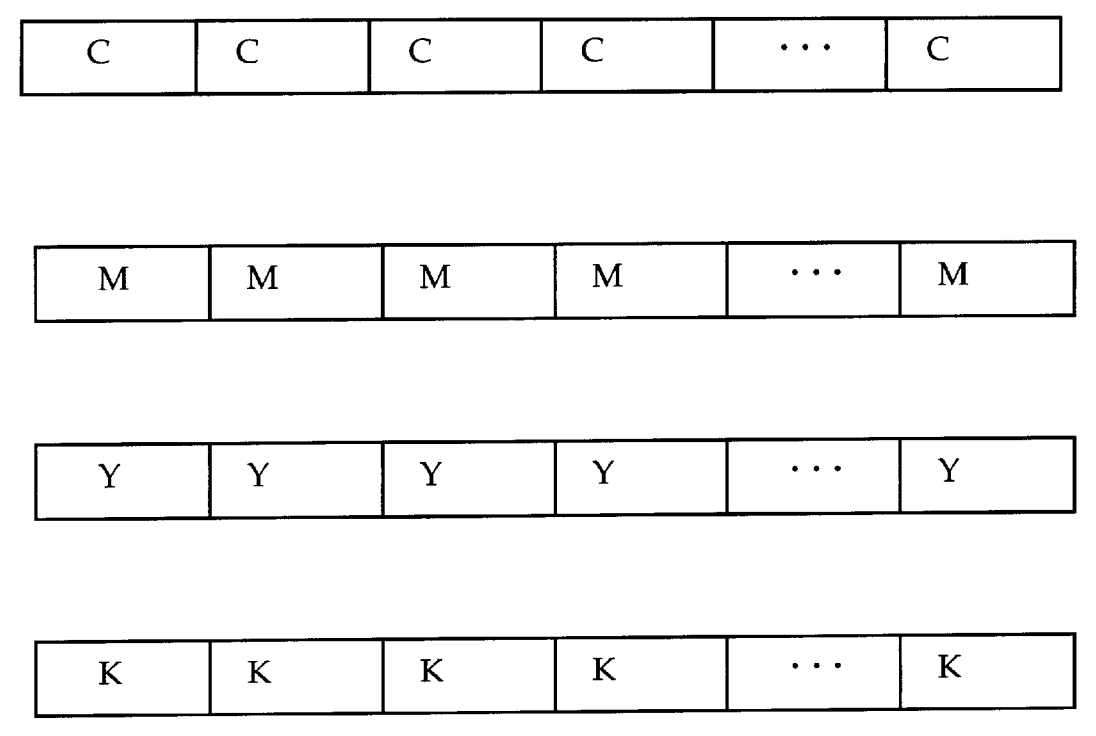

The control registers 422 include an identification (ID) register for storing system revision and identification information. A vector table pointer register is accessed to identify the locations in memory where compressed and decompressed image data is stored for a given row of partitioned blocks. In an exemplary embodiment, a separate plane in memory is used for each of the cyan, magenta, yellow and black color components, as illustrated in FIG. 7. Accordingly, the vector register table includes a cyan pointer register, a magenta pointer register, a yellow pointer register and a black pointer register. The vector register table also includes a side information pointer register and a compressed data pointer register. Each color component is represented by 8-bits which identify one of up to 256 values for each color component.

For color variant blocks, the mask base register and the C0/C1 encoding select register are accessed. These registers map the original 32-bit color in a color variant partitioned block of each pixel to colors included in the reduced color look-up table (that is, the exemplary 64 entry variance color look-up table).

The horizontal total pixel count register, and the vertical total pixel count register, which store values representing the total number of pixels in each row and in each column, respectively of an incoming frame of image data, are also included in the registers 422. A vertical offset register can also be included to store an address offset between vertically adjacent pixels in an image to accommodate use of a one-dimensional memory for storing a two-dimensional image. Other registers are included for interrupt, enable and acknowledgement, command, operation status, and test functions.

It is apparent from the foregoing discussion that in an exemplary embodiment, the compression operation is implemented using both hardware and software. However, to enhance the performance of the compression operation, the decompression functions of an exemplary embodiment are primarily implemented in hardware. The decompressor functions implemented in an exemplary compression/decompression coprocessor are, for the most part, identical to those of the video interface device 112 (FIG. 1). FIG. 8, which illustrates exemplary hardware processing included within the video interface device, will therefore be used to describe the exemplary hardware decompression of the compression/decompression coprocessor.

b. CDC Configuration - Decompression

Referring to FIG. 8, decompression is initiated by fetching compressed data in the form of compressed data blocks from memory locations identified by a compressed data pointer register. The compressed data blocks are loaded into the compressed data input first-in first-out memory 602, non-variance data being loaded from locations identified by the vector table pointer register to accommodate the use of different color planes in memory. Because compressed data blocks can span word boundaries of memory, two compressed data blocks (that is, two data words) are loaded into a 64-bit register 604 and barrel shifted to the right by an amount indicated by the specified width of a compressed data word before each color field is extracted.

A field extraction unit 606 then extracts each color field of the compressed data word. If the compressed data block is of the non-variance type, then up to the four color components previously mentioned are extracted. If the compressed data block is of the variance type, then the mask is extracted along with the C0 and C1 values. Color fields which are less than 8-bits wide are replicated to an 8-bit width to provide, for four color printing, a 32-bit compressed data block.

For a variance block, mask look-up is performed if a mask compression mode had been selected. If mask look-up is required, the 1 k entry decompression mask look-up table 608 is searched using the compressed mask look-up index.

As a mask is being looked-up in memory, a color look-up for the colors C0 and C1 is performed using the variance color look-up table, if required. C0 and C1 are 0-extended to a full six bits before searching the variance color look-up table 610. The 6-bit input to the variance color look-up table 610 is selected by a selector 612, which in accordance with an exemplary embodiment corresponds to the multiplexers and row and column counters of FIG. 9.

Figure 9:
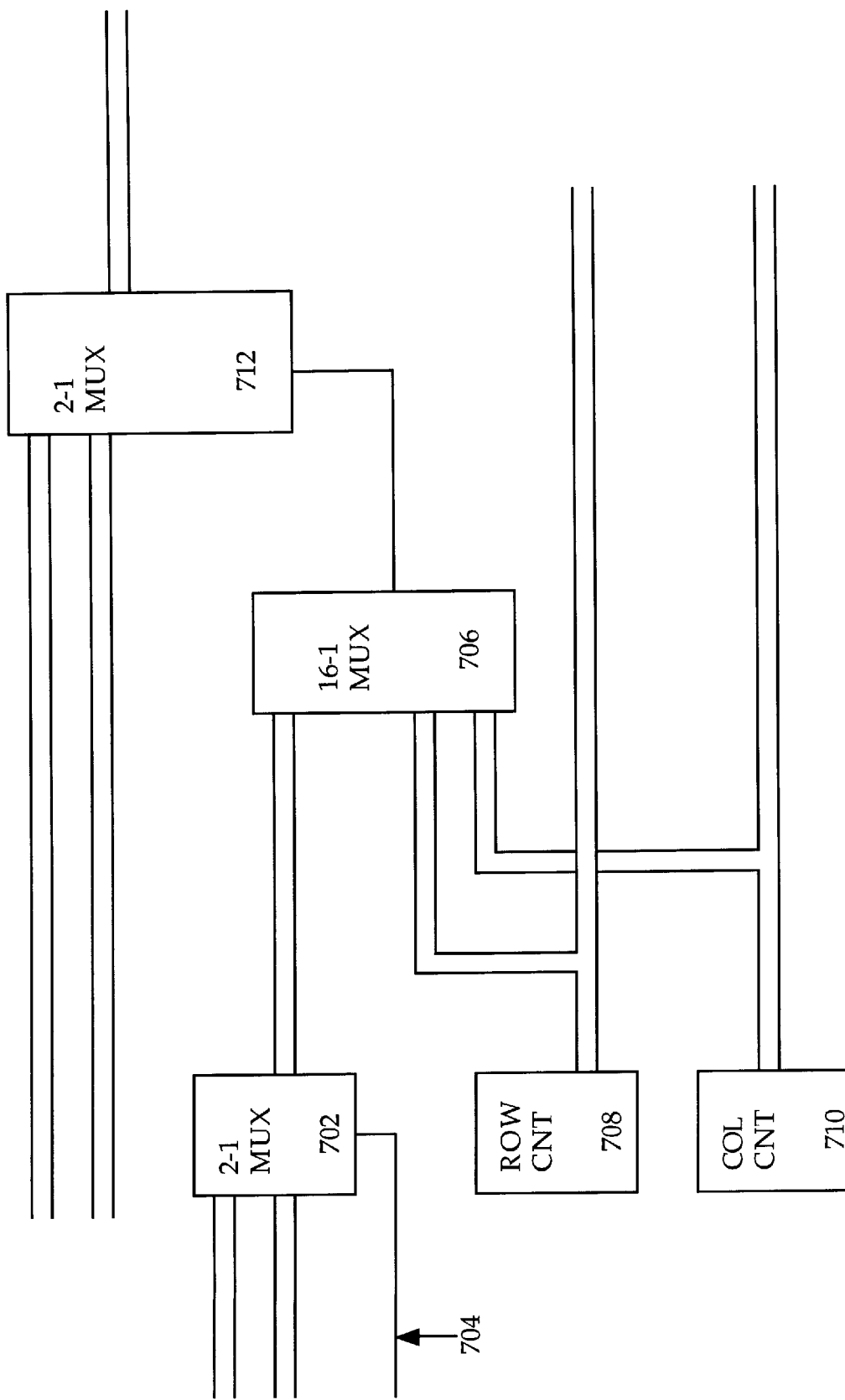
FIG. 9 illustrates an exemplary embodiment of a selector included within the FIG. 8 hardware.

Referring to FIG. 9, a 2-to-1 multiplexer 702 receives both a non-compressed 16-bit mask from the compressed data block, or a 16-bit output from the mask look-up table. A mode select input 704 to the multiplexer 702 identifies whether a compressed mask has been used so that the appropriate input to the multiplexer 702 can be selected and output to a 16-to-1 multiplexer 706. The output from the multiplexer 706 is selected by the bits from the row and column counters used to identify a given row and column in a partitioned block of pixels. The row and column counters are labelled counters 708 and 710 in FIG. 9, respectively. The output from the multiplexer 706 corresponds to a single pixel within a partitioned block of pixels, and identifies whether the color associated with the pixel is C0 or C1.

The output from the multiplexer 706 is used as a select input to a 2-to-1 multiplexer 712 for selecting either the 6-bit index for identifying the color C0 or the 6-bit index for identifying the color C1. The selected 6-bit output from the multiplexer 712 is used as a look-up address for the variance color look-up table 610 of FIG. 8, and thereby produces a 32-bit color output corresponding to the decompressed color C0 or C1.

The 32-bit output from the variance color look-up table is supplied to a multiplexer 614. The multiplexer 614 also receives a 32-bit input directly from the field extraction unit to accommodate decompressed data blocks of the non-variance type. A select line 616 to the multiplexer 614 corresponds to the select bit which identifies whether the partitioned block of pixels is of the variance type or the non-variance type. Depending on the binary state of this select bit, either the 32-bit data output directly from the field extraction unit 606 is selected or, in the case of a variance type block, a 32-bit output from the variance color look-up table 610 is selected. This process is repeated for each pixel of a partitioned block.

FIG. 8 also illustrates the supply of address and data information to each of the look-up table 608, the variance color table 610, a threshold matrix 622 and a video modulation look-up table 622. Such address and data lines are used to store data in these tables and to read data therefrom during testing, if desired. Aspects of features provided in the exemplary FIG. 8 embodiment such as grey component removal 618, threshold matrix 620 and video modulation look-up table are not necessary to understanding the present invention. For more detail regarding exemplary embodiments of these features, as well as a more detailed discussion of operation of the FIG. 8 embodiment, reference is made to the aforementioned commonly assigned U.S. application Ser. No. 08/397,372.

5. Video Interfacing Device

The video interface device can be used for decompressing data such that it can be output to, for example, a display or printer. Features included in the video interface device for decompressing the image data duplicate features included within the decompression engine of the compression/decompression coprocessor 108. Any additional features of the video interface device which do not duplicate structure and function of the compression/decompression coprocessor are outside the scope of the present invention and need not be described in detail. Rather attention is directed to the aforementioned commonly assigned U.S. application Ser. No. 08/397,372 for a more detailed discussion of an exemplary video interface device suitable for use with the exemplary embodiments of the present invention.

While the foregoing has set forth exemplary embodiments of the present invention, those skilled in the art will appreciate that these examples are by way of illustration only. For example, while exemplary embodiments have been described in connection with data compression with respect to pixmaps used in connection with printing, those skilled in the art will appreciate that techniques of the present invention are also suitable for the reduction of information transmitted between computers, or between a computer and an input device such as a scanner, or between a computer and an output device (such as a printer).

Further, those skilled in the art will appreciate that the partitioned blocks described above can be of any dimension.

Further, the partitioning can be adaptive and dynamic, even within a given frame of image data, with the only requirement being that dimensional information be made known to the decompression process.

Exact dimensions of compressed and decompressed data blocks can also be modified as desired by the user, and the 29-bit value for compressed data blocks is by way of example only. Further, the compressed data and decompressed data block size need not remain fixed, but could be varied from block-to-block. Encoded variant and invariant block sizes can also be different from one another.

In addition, those skilled in the art will appreciate that a fixed color palette need not be used. Rather, the color palette can be dynamically assigned as long as the update information is part of the compressed data storage or stream.

Although variant blocks as described in the exemplary embodiment above are encoded as a 1-bit mask with two sub-palettes of a larger color palette, those skilled in the art will appreciate that masks of any size can be used. For example, a mask of 3-bits for each pixel can be used, with each 3-bits pointing to a palette or sub-palette of eight color values.

Those skilled in the art will further appreciate that invariant blocks need not correspond to blocks where all pixels have the same value. Rather, blocks with pixels that fall within an acceptable range can be mapped into an invariant color block, using a value that represents the entire block, with no visible degradation.

In accordance with alternate embodiments, those skilled in the art will appreciate that the variant and non-variant select indicator bit for each block need not be specifically encoded. For example, if a large area of the pixmap is non-variant, then the selector bit can be further compressed. For example, the selector bit can be encoded in run length fashion.

Further, known compression techniques can be used in conjunction with the compression techniques of the present invention. For example, two successive non-variant blocks can be encoded using a repeat flag, without having to encode the full information for the second and successive blocks. Further, where successive non-variant blocks differ only slightly from a preceding non-variant block, the known compression technique of delta modulation can be used to further compress the data. This use of such known compression techniques in accordance with the present invention is by way of illustration only, and any number of known compression techniques can be used in accordance with the present invention to improve compression.

Further, while compression has been described with respect to all components of a given pixel at one time, those skilled in the art will appreciate that the color components can be compressed separately.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for processing a frame of image data comprising the steps of:
    partitioning said frame of image data into a plurality of partitioned blocks of pixels;
    identifying each partitioned block as being color variant or color invariant, including identifying partitioned blocks of pixels as being of a user-specified classification, and storing information which identifies those partitioned blocks identified as being of the user-specified classification;
    storing color values of at least some of said pixels; storing information which identifies each partitioned block as being color variant or color invariant; and
    compressing the partitioned blocks of pixels of the frame of image data in groups by retrieving the information which identifies each partitioned block as being either color variant or color invariant, controlling a retrieval of said color values in response to said retrieved information, and retrieving stored color values for all pixels in each group of partitioned blocks when any one of said partitioned blocks within the group is identified as being color variant.

2. Apparatus for processing a frame of image data comprising:
    a processor for partitioning said frame of image data into a plurality of partitioned blocks of pixels, and for identifying each partitioned block has being color variant, color invariant or clear; and
    a memory for storing color values of at least some of said pixels, and for storing information which identifies each partitioned block as being color variant, color invariant or clears
    wherein the processor compresses the frame of image data by retrieving the information stored in the memory which identifies each partitioned block as being color variant, color invariant or clear, controls a retrieval of color values stored in the memory in response to the retrieved information, and retrieves stored color values for all pixels in at least one group of partitioned blocks when any one of said partitioned blocks within the group is identified as being color variant.

3. A method according to claim 1, wherein said user-specified classification is a clear block of pixels.

4. A method according to claim 1, wherein said step of compression further includes a step of:
    retrieving a stored color value for a single pixel in a partitioned block when all partitioned blocks within said group of partitioned blocks are identified as being color invariant.

5. A method according to claim 4, wherein said step of compressing further includes a step of:
    using a predetermined color value to represent said group of partitioned blocks when all partitioned blocks in said group are identified as being clear.

6. A method according to claim 1, wherein said step of compressing further includes a step of:
    using a predetermined color value to represent said group of partitioned blocks when all partitioned blocks in said group are identified as being clear.

7. A method according to claim 1, wherein a partitioned block determined to be color variant includes an array of pixels having at least two different color values.

8. A method according to claim 1, wherein each partitioned block is a 4×4 pixel array from said frame of image data.

9. Apparatus according to claim 2, wherein said information which identifies each partitioned block as being color variant, color invariant or clear is stored at a location of said memory which is separately addressable by said processor for compressing said frame of image data.

* * * * *